US 12,148,909 B2

(12) United States Patent
Kano et al.

(10) Patent No.: US 12,148,909 B2
(45) Date of Patent: Nov. 19, 2024

(54) ELECTRIC VEHICLE

(71) Applicant: HONDA MOTOR CO., LTD., Tokyo (JP)

(72) Inventors: Hiroshi Kano, Tokyo (JP); Tetsuya Sugizaki, Tokyo (JP); Hiroki Sakamoto, Tokyo (JP); Jaewon Son, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 333 days.

(21) Appl. No.: 17/678,065

(22) Filed: Feb. 23, 2022

(65) Prior Publication Data

US 2022/0320630 A1    Oct. 6, 2022

(30) Foreign Application Priority Data

Mar. 30, 2021    (JP) ................. 2021-058165

(51) Int. Cl.
*H01M 10/6563*    (2014.01)
*B60K 1/00*    (2006.01)
(Continued)

(52) U.S. Cl.
CPC ........... *H01M 10/6563* (2015.04); *B60K 1/04* (2013.01); *B60L 58/26* (2019.02); *H01M 10/613* (2015.04);
(Continued)

(58) Field of Classification Search
USPC ....................................................... 296/208
See application file for complete search history.

(56) References Cited

U.S. PATENT DOCUMENTS 6,662,891 B2 * 12/2003 Misu ................. B60W 10/30
903/952
7,419,209 B1 * 9/2008 Mangiapane ....... H01M 50/244
296/63
(Continued)

FOREIGN PATENT DOCUMENTS

CN    101340013    1/2009
CN    102652073    8/2012
(Continued)

OTHER PUBLICATIONS

Japanese Notice of Allowance for Japanese Patent Application No. 2021-058165 mailed Jan. 10, 2023.
(Continued)

*Primary Examiner* — Amy R Weisberg
*Assistant Examiner* — Veronica M Shull
(74) *Attorney, Agent, or Firm* — Amin, Turocy & Watson, LLP

(57) ABSTRACT

An electric vehicle includes: a power storage device; a floor member disposed on a bottom portion of a vehicle body; and a cover member fixed to the floor member and forming a storage space for the power storage device between the floor member and the cover member. The electric vehicle includes: an intake port introducing air in a passenger compartment into the storage space; and an exhaust port exhausting air having been heat-exchanged with the power storage device in the storage space into the passenger compartment. The exhaust port is composed of the floor member and the cover member.

8 Claims, 8 Drawing Sheets

(51) Int. Cl.
  B60K 1/04     (2019.01)
  B60L 50/60    (2019.01)
  B60L 58/26    (2019.01)
  H01M 10/613   (2014.01)
  H01M 10/625   (2014.01)
  H01M 50/244   (2021.01)
  H01M 50/249   (2021.01)

(52) U.S. Cl.
  CPC ....... *H01M 10/625* (2015.04); *H01M 50/244* (2021.01); *H01M 50/249* (2021.01); *B60K 2001/005* (2013.01); *B60K 2001/0422* (2013.01); *B60K 2001/0433* (2013.01); *B60L 50/60* (2019.02); *H01M 2220/20* (2013.01)

(56) References Cited

U.S. PATENT DOCUMENTS

| | | | | |
|---|---|---|---|---|
| 10,150,346 | B2* | 12/2018 | Koyama | B62D 27/02 |
| 10,220,670 | B2* | 3/2019 | Koyama | B60N 3/048 |
| 11,897,542 | B2* | 2/2024 | Nakano | B62D 21/15 |
| 2008/0296075 | A1* | 12/2008 | Zhu | B60N 2/5621 |
| | | | | 180/68.1 |
| 2010/0099019 | A1 | 4/2010 | Nagata et al. | |
| 2012/0247848 | A1 | 10/2012 | Kosaka et al. | |
| 2013/0092348 | A1 | 4/2013 | Bito | |
| 2013/0122338 | A1 | 5/2013 | Katayama et al. | |
| 2013/0140101 | A1 | 6/2013 | Lim et al. | |
| 2014/0299396 | A1 | 10/2014 | Tajima | |
| 2015/0343891 | A1 | 12/2015 | Honda et al. | |
| 2016/0243919 | A1* | 8/2016 | Yamanaka | H01M 10/613 |
| 2018/0015806 | A1 | 1/2018 | Yasuda et al. | |
| 2018/0050606 | A1 | 2/2018 | Sugitate et al. | |
| 2018/0345759 | A1 | 12/2018 | Okumura | |
| 2021/0257694 | A1* | 8/2021 | Kim | B60L 50/64 |
| 2023/0211655 | A1* | 7/2023 | Murata | B62D 25/20 |
| | | | | 180/68.5 |

FOREIGN PATENT DOCUMENTS

| | | | |
|---|---|---|---|
| CN | 102897228 | 1/2013 | |
| CN | 103050742 | 4/2013 | |
| CN | 103107382 | 5/2013 | |
| CN | 103129359 | 6/2013 | |
| CN | 103998271 | 8/2014 | |
| CN | 203957841 | 11/2014 | |
| CN | 104401403 | 3/2015 | |
| CN | 104884290 | 9/2015 | |
| CN | 107709074 | 2/2018 | |
| CN | 108290493 | 7/2018 | |
| CN | 112440829 | 3/2021 | |
| CN | 212725448 | 3/2021 | |
| FR | 3028456 A1 * | 5/2016 | ............... B60K 1/04 |
| JP | 2004-158202 | 6/2004 | |
| JP | 2005-306239 | 11/2005 | |
| JP | 2006-185863 | 7/2006 | |
| JP | 2012-179979 | 9/2012 | |
| JP | 2013-244768 | 12/2013 | |
| JP | 2014104891 A * | 6/2014 | ............... B60K 1/04 |
| JP | 2020-172225 | 10/2020 | |
| WO | 2009/066661 | 5/2009 | |
| WO | 2015/074495 | 5/2015 | |
| WO | 2017/094445 | 6/2017 | |

OTHER PUBLICATIONS

Chinese Notice of Allowance for Chinese Patent Application No. 202210119176.3 mailed Mar. 29, 2024.

* cited by examiner

ELECTRIC VEHICLE

CROSS-REFERENCE TO RELATED APPLICATION

Priority is claimed on Japanese Patent Application No. 2021-058165, filed on Mar. 30, 2021, the contents of which are incorporated herein by reference.

BACKGROUND

Field of the Invention

The present invention relates to an electric vehicle including a power storage device.

Background

Many electric vehicles such as hybrid vehicles and electric automobiles are equipped with high-voltage power storage devices. As such electric vehicles, an electric vehicle having a power storage device mounted on a floor panel is known (see PCT International Publication No. WO2017/094445).

In the electric vehicle described in PCT International Publication No. WO2017/094445, a storage recess is provided below an occupant seat on the floor panel and a casing for storing the power storage device is disposed in the storage recess. An intake fan is disposed in the casing together with the power storage device. Air in a passenger compartment can be sucked into a storage space for the power storage device inside the casing through an intake grill (intake port). Further, the sucked air exchanges heat with the power storage device in the storage space and then is exhausted to a plurality of positions in the passenger compartment through an exhaust duct (exhaust port).

SUMMARY

In the electric vehicle described in PCT International Publication No. WO2017/094445, since the air that has been heat-exchanged with the power storage device is exhausted to a plurality of positions in the passenger compartment through the intake duct, it is possible to eliminate the bias of the flow of hot air (exhaust) blown into the passenger compartment. However, in the electric vehicle, since it is necessary to provide a plurality of dedicated ducts for exhausting the air that has been heat-exchanged with the power storage device into the passenger compartment, the number of components around the power storage device increases.

An aspect of the present invention is to provide an electric vehicle capable of stably exhausting air having been heat-exchanged with a power storage device into a passenger compartment without increasing the number of components around the power storage device.

An electric vehicle according to an aspect of the present invention includes: a power storage device; a floor member disposed on a bottom portion of a vehicle body; a cover member fixed to the floor member and forming a storage space for the power storage device between the floor member and the cover member; an intake port introducing air in a passenger compartment into the storage space; and an exhaust port exhausting air having been heat-exchanged with the power storage device in the storage space into the passenger compartment, wherein the exhaust port is composed of the floor member and the cover member.

With the above-described configuration, the power storage device that emits heat in use is disposed in the storage space surrounded by the floor member and the cover member. The air sucked into the storage space cools the power storage device in the storage space and then is exhausted into the passenger compartment while passing through the exhaust port composed of the floor member and the cover member.

In this configuration, since the floor member and the cover member constitute the exhaust port, it is not necessary to provide a dedicated duct for forming the exhaust port.

The cover member may include a front wall disposed in front of the power storage device, and the exhaust port may be provided between the front wall and the floor member.

In this case, since the exhaust port is provided between the floor member and the front wall of the cover member, the air having cooled the power storage device can be efficiently exhausted to the front side in the passenger compartment. Further, the front wall of the cover member can be widely formed along the vehicle width direction. Therefore, when this configuration is adopted, the exhaust port is provided in a wide range and the warm air having been heat-exchanged with the power storage device can be exhausted into the passenger compartment in a diffused state.

The front wall of the cover member may include a cover opening portion opening downward in a substantially center region of a vehicle width direction, the floor member may include a floor panel and a floor tunnel provided in a center region of the floor panel in the vehicle width direction to extend along a front and rear direction of the vehicle body such that a rear end portion is disposed in a vicinity of the front wall of the cover member, an upper edge portion of the cover opening portion of the front wall and an upper surface of the floor tunnel may be connected through a connection plate, and a center opening constituting the exhaust port may be provided between the upper surface of the floor tunnel and the connection plate.

In this case, the upper edge portion of the cover opening portion on the side of the cover member and the upper surface of the floor tunnel are connected to each other by the connection plate and the center opening for an exhaust is provided between the upper surface of the floor tunnel and the connection plate. Therefore, the air that has cooled the power storage device in the storage space can be exhausted from the center opening to the front side of the vehicle along the upper surface of the floor tunnel. The air exhausted in this way is smoothly sucked to the air conditioning device in front of the vehicle. Thus, when this configuration is adopted, it is possible to suppress impairment of the air conditioning comfort in the passenger compartment by the heat of the air discharged from the storage space.

A side opening constituting the exhaust port may be provided between a side edge of the cover opening portion and a side surface of the floor tunnel.

In this case, the air having cooled the power storage device in the storage space can also be exhausted not only from the center opening on the side of the upper surface of the floor tunnel but also from the side opening. Therefore, the exhaust blown to the passenger compartment side can be widely dispersed. Thus, when this configuration is adopted, it is possible to expand the opening area of the entire exhaust port and suppress the generation of wind noise due to an increase in the flow velocity of the blown air.

The floor member may include a floor panel and a cross member disposed on an upper portion of the floor panel along the vehicle width direction, the front wall of the cover member may be fixed to the cross member, and a gap constituting the exhaust port may be provided between the cross member and the front wall of the cover member.

In this case, the exhaust port can be formed along the cross member extending in the vehicle width direction. Therefore, the exhaust can be widely dispersed from the storage space to the passenger compartment side. Further, since the front wall of the cover member is fixed to the cross member, the rigidity of the front wall of the cover member can be increased.

Further, when the front wall of the cover member is joined to the upper surface of the floor tunnel through the connection plate, the rigidity of the rear portion of the floor tunnel can also be increased through the connection plate and the front wall of the cover member.

A seat cushion on which an occupant sits may be disposed above the cover member, and the gap may open downward from the storage space.

In this case, it is possible to suppress the warm air blown from the gap (exhaust port) between the cross member and the front wall of the cover member from directly hitting the legs of the occupant and deteriorating the air conditioning comfort provided to the occupant.

The exhaust port may be disposed at a lower position of an interior trim covering a part of the cover member and the floor member.

In this case, it is possible to suppress the warm air exhausted from the exhaust port from being blown directly into the occupant space. Thus, it is possible to suppress the deterioration of the air conditioning comfort provided to the occupant.

The electric vehicle may include an intake fan sucking air in the passenger compartment into the storage space through the intake port, and an auxiliary intake port sucking exhaust side air leaking from a gap between the cover member or the floor member and the interior trim may be provided on an intake introduction portion continuous to the intake fan of the intake port.

In this case, the exhaust side air leaking from the gap of the interior trim can be sucked to the intake introduction portion through the auxiliary intake port. Thus, when this configuration is adopted, it is possible to suppress the heat-exchanged warm air leaking from the gap of the interior trim from flowing into the occupant compartment side and further improve the air conditioning comfort provided to the occupant.

In the electric vehicle according to the aspect of the present invention, since the floor member and the cover member constitute the exhaust port, it is possible to stably exhaust the air that has been heat-exchanged with the power storage device into the passenger compartment without providing a dedicated duct for forming the exhaust port.

DESCRIPTION OF EMBODIMENTS

Figure 1:
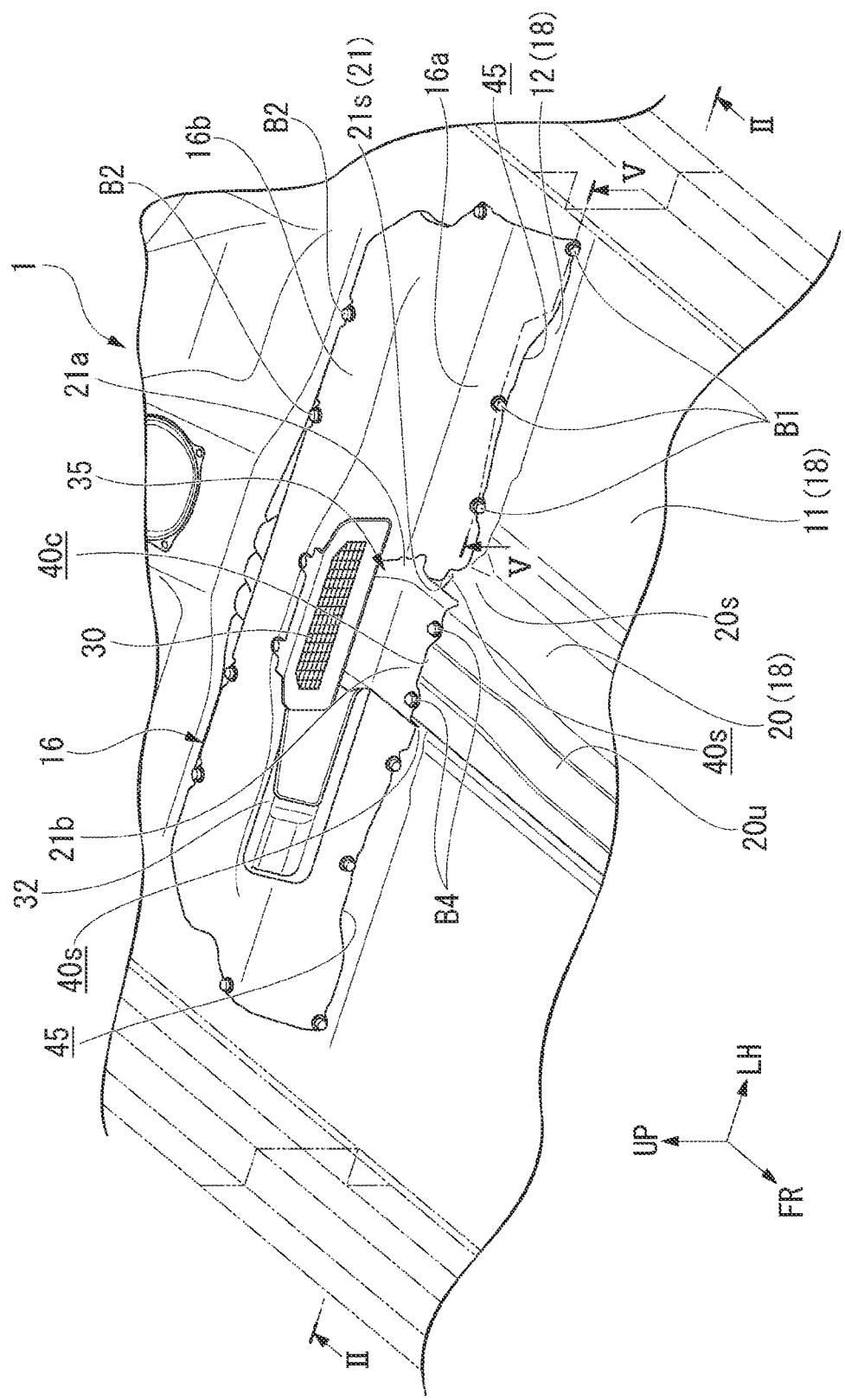
FIG. 1 is a perspective view showing a rear portion of a floor of an electric vehicle of an embodiment.

Hereinafter, an embodiment of the present invention will be described with reference to the drawings. In the following description, front and rear, up and down, and left and right mean the direction of the vehicle with respect to the forward direction unless otherwise specified. Further, an arrow FR indicating the front side of the vehicle, an arrow UP indicating the upper side of the vehicle, and an arrow LH indicating the left side of the vehicle are written in the appropriate place of the drawing.

Figure 2:
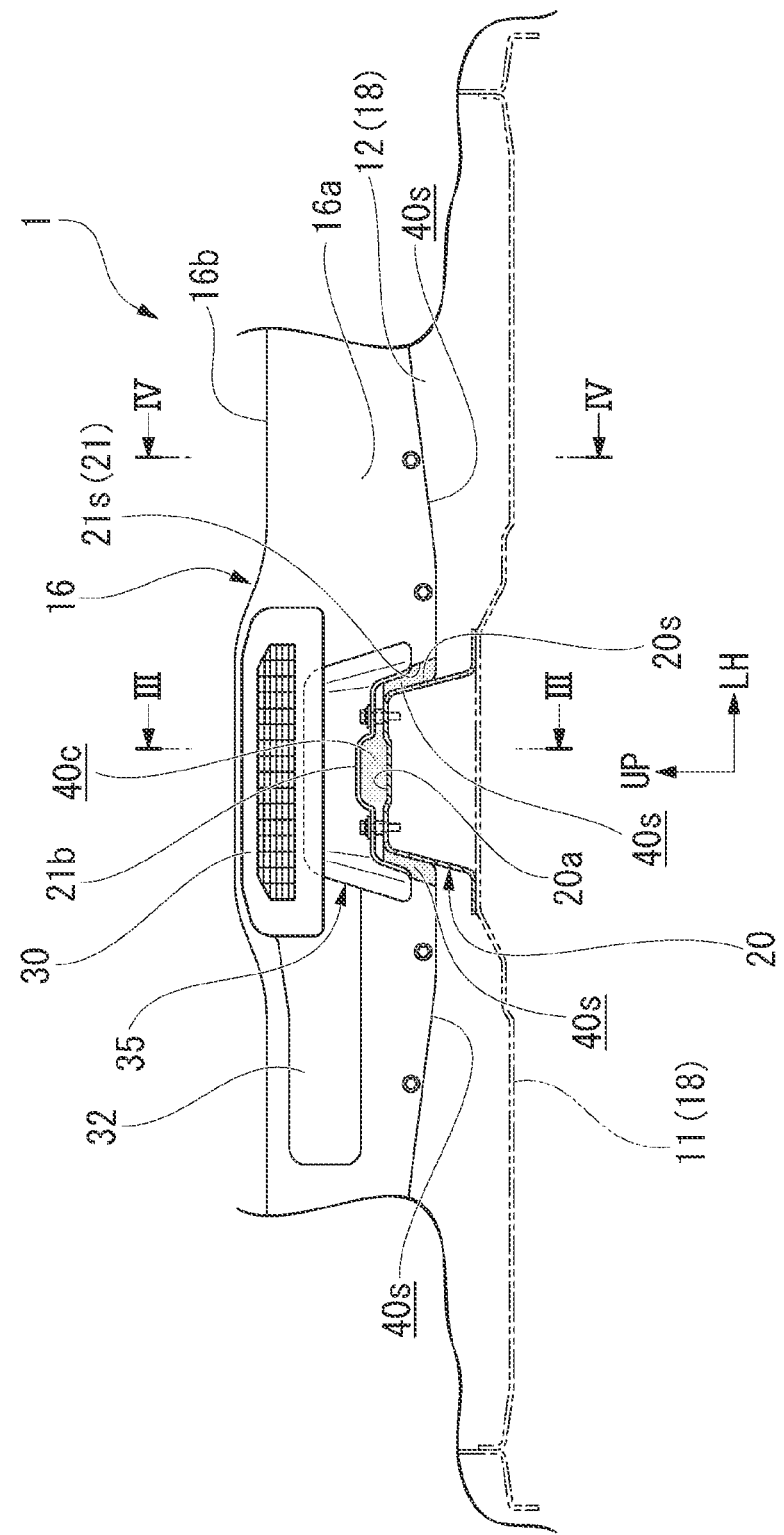
FIG. 2 is a partially cross-sectional front view of the electric vehicle of the embodiment in a cross-section portion taken along the line II-II of FIG. 1.
Figure 3:
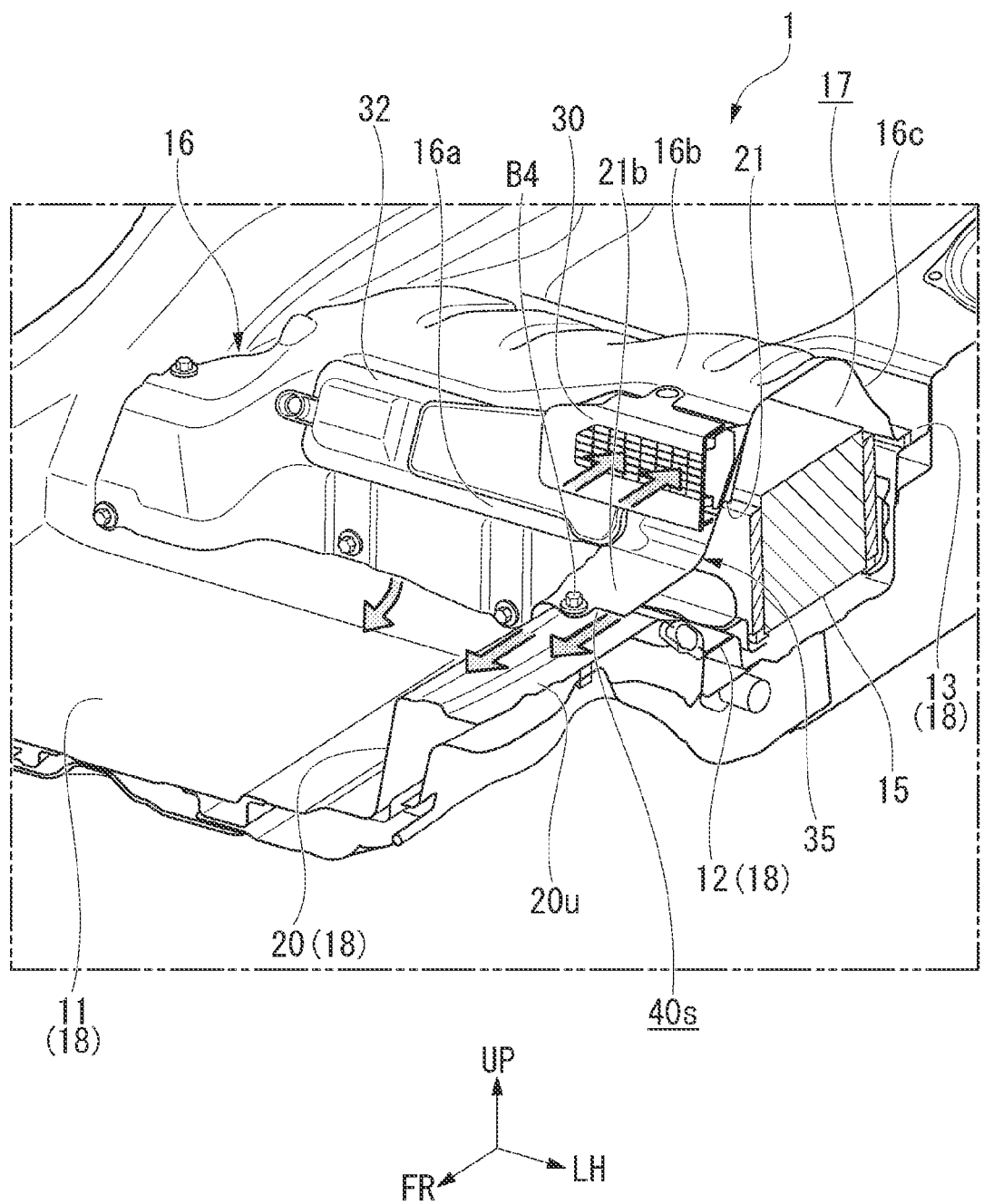
FIG. 3 is a partially cross-sectional perspective view of the electric vehicle of the embodiment in a cross-section portion taken along the line III-III of FIG. 2.
Figure 4:
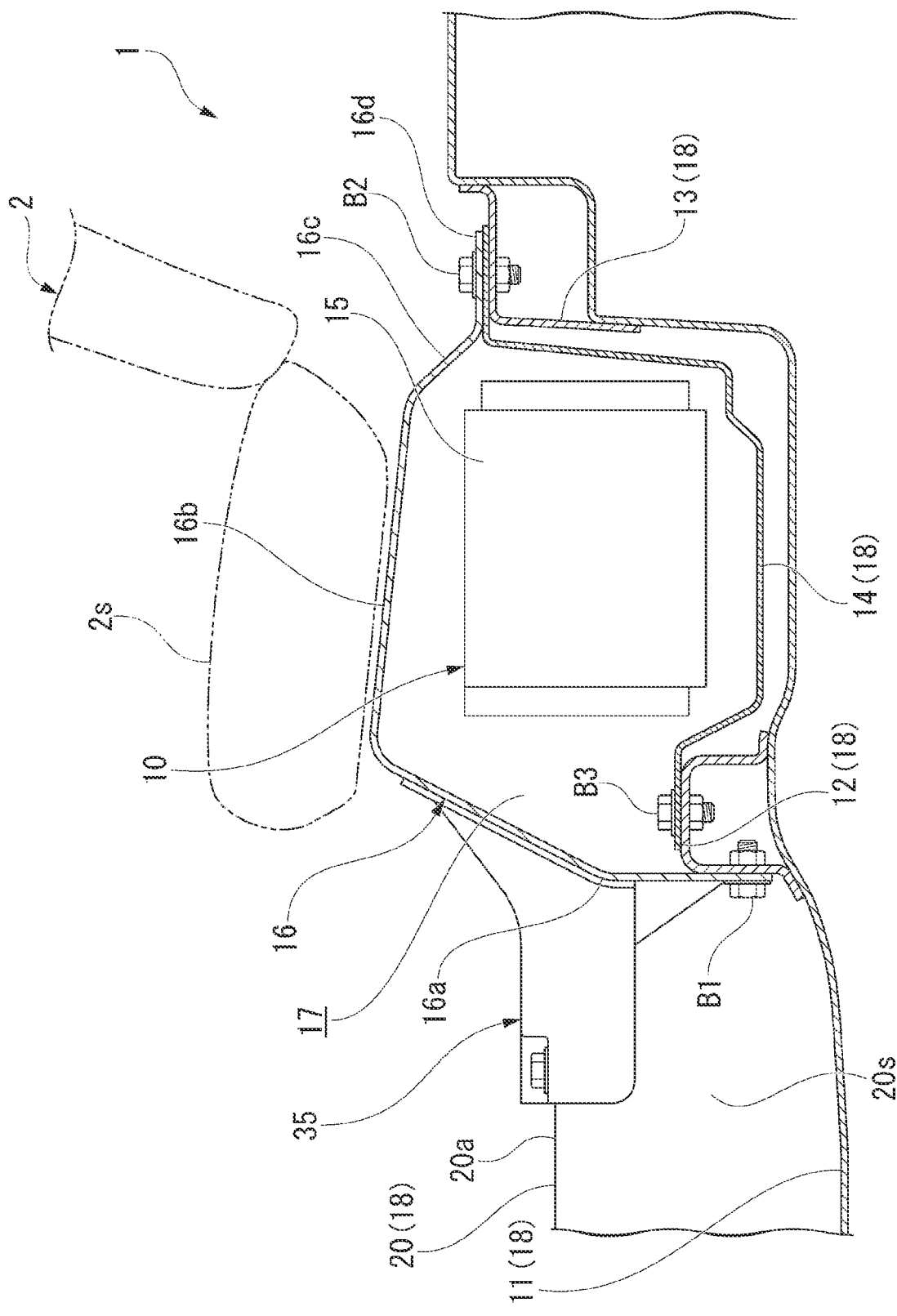
FIG. 4 is a cross-sectional view of the electric vehicle of the embodiment taken along the line IV-IV of FIG. 2.

FIG. 1 is a view of a rear portion of a floor of an electric vehicle 1 of this embodiment as viewed from diagonally above the front left. FIG. 2 is a partially cross-sectional front view of the electric vehicle 1 in a cross-section portion taken along the line II-II of FIG. 1. Further, FIG. 3 is a partially cross-sectional perspective view of the electric vehicle 1 in a cross-section portion taken along the line III-III of FIG. 2. FIG. 4 is a cross-sectional view taken along the line IV-IV of FIG. 2.

The electric vehicle 1 is a vehicle such as a hybrid vehicle or an electric vehicle equipped with a vehicle driving motor (not shown), and includes a power storage device 10 for driving the motor. In the electric vehicle 1, the power storage device 10 is mounted at a lower position of a rear seat 2 in a passenger compartment. A mounting portion of the power storage device 10 is provided on the floor panel 11.

Specifically, a front cross member 12 and a rear cross member 13 are arranged at a position substantially below the rear seat 2 on the floor panel 11 to be separated from each other in the front and rear direction. Both the front cross member 12 and the rear cross member 13 are joined to the floor panel 11 to form a closed cross-section extending along the vehicle width direction together with the floor panel 11. A metallic base plate 14 is erected on the front cross member 12 and the rear cross member 13. The base plate 14 extends along the vehicle width direction similarly to the front cross member 12 or the rear cross member 13.

The power storage device 10 includes a battery module 15 configured by stacking a plurality of batteries and a control unit (not shown) which controls discharge and charge between the battery module 15 and the vehicle driving motor. The battery module 15 is used for a high voltage and generates high heat during discharging and charging. The power storage device 10 is installed on the base plate 14 extending in the vehicle width direction. The upper side of the power storage device 10 installed on the base plate 14 is covered with a metallic cover member 16.

As shown in FIG. 4, the cover member 16 is formed in a substantially U-shaped cross-sectional shape that opens downward. Specifically, the cover member 16 includes a front wall 16a which rises upward from below, an upper wall 16b which extends backward from the upper end portion of the front wall 16a, a rear wall 16c which extends obliquely downward from the rear end portion of the upper wall 16b, and a rear flange 16*d* which bends backward and extends from the lower end of the rear wall 16*c*.

The front wall 16*a* is longer than the rear wall 16*c* and extends downward from the upper wall 16*b*. The lower edge portion of the front wall 16*a* is superposed on the front surface of the front cross member 12 and the rear flange 16*d* is superposed on the upper surface of the rear edge portion of the base plate 14 superposed on the upper surface of the rear cross member 13. In this state, the lower edge portion of the front wall 16*a* of the cover member 16 is fastened to the front cross member 12 by a bolt B1 and the rear flange 16*d* of the cover member 16 is simultaneously fixed to the rear cross member 13 together with the rear edge portion of the base plate 14 by a bolt B2. Additionally, the front edge portion of the base plate 14 is superposed on the upper surface of the front cross member 12 and is fastened to the front cross member 12 by a bolt B3 in this state.

In this way, the cover member 16 of which the front wall 16*a* and the rear flange 16*d* are joined to the front cross member 12 and the rear cross member 13 forms a storage space 17 of the power storage device 10 together with the base plate 14. Additionally, in this embodiment, the base plate 14 constitutes a floor member 18 together with the floor panel 11, the front cross member 12, the rear cross member 13, and the like. Air in the passenger compartment is sucked into the storage space 17 by an intake fan 19 (see FIG. 6). The air sucked into the storage space 17 exchanges heat with the power storage device 10 (mainly the battery module 15) to cool the power storage device 10 and the heated air is exhausted into the passenger compartment.

Further, a floor tunnel 20 that rises upward in a substantially U-shaped cross-section is provided in the center region of the floor panel 11 in the vehicle width direction. In the floor tunnel 20, a substantially U-shaped cross-section that rises upward continuously extends in the front and rear direction of the vehicle body. The rear end portion of the floor tunnel 20 is disposed in the vicinity of the front wall 16*a* of the cover member 16.

The front wall 16*a* of the cover member 16 that faces the rear end portion of the floor tunnel 20 is provided with a cover opening portion 21 which is larger than the rear end portion of the floor tunnel 20. The cover opening portion 21 opens downward in a substantially trapezoidal shape in a substantially center region of the front wall 16*a* in the vehicle width direction. The upper edge of the cover opening portion 21 is disposed above an upper surface 20*u* of the floor tunnel 20 and the left and right side edges 21*s* of the cover opening portion 21 are located on the outside of the side surface of the floor tunnel 20 in the vehicle width direction.

In the front surface of the front wall 16*a* of the cover member 16, a connection plate 35 which connects the upper edge region of the cover opening portion 21 and the upper surface of the floor tunnel 20 is attached to the upper edge region. The connection plate 35 includes a base portion 21*a* which is joined to the upper edge region of the cover opening portion 21 and a front connection piece 21*b* which has a downward U-shaped cross-section extending forward from the base portion 21*a*. The base portion 21*a* is joined to the front wall 16*a* of the cover member 16 by an appropriate means such as welding. The front connection piece 21*b* is superposed on a part of a side surface 20*s* and the upper surface 20*u* of the rear portion of the floor tunnel 20 and is fastened and fixed to the upper surface 20*u* of the floor tunnel 20 by a bolt B4 in that state. A center opening 40*c* that constitutes an exhaust port is formed between two fastening positions of the bolt B4 in the front connection piece 21*b* and the upper surface 20*u* of the floor tunnel 20. The center opening 40*c* communicates with the storage space 17 inside the cover member 16 and exhausts the air that has been heat-exchanged with the power storage device 10 in the storage space 17 into the passenger compartment.

Further, a side opening 40*s* that constitutes an exhaust port is formed between a side edge 21*s* of the cover opening portion 21 on the side of the cover member 16 and the side surface 20*s* of the floor tunnel 20. The side opening 40*s* communicates with the storage space 17 inside the cover member 16 and exhausts the air that has been heat-exchanged with the power storage device 10 in the storage space 17 into the passenger compartment together with the center opening 40*c*.

Figure 5:
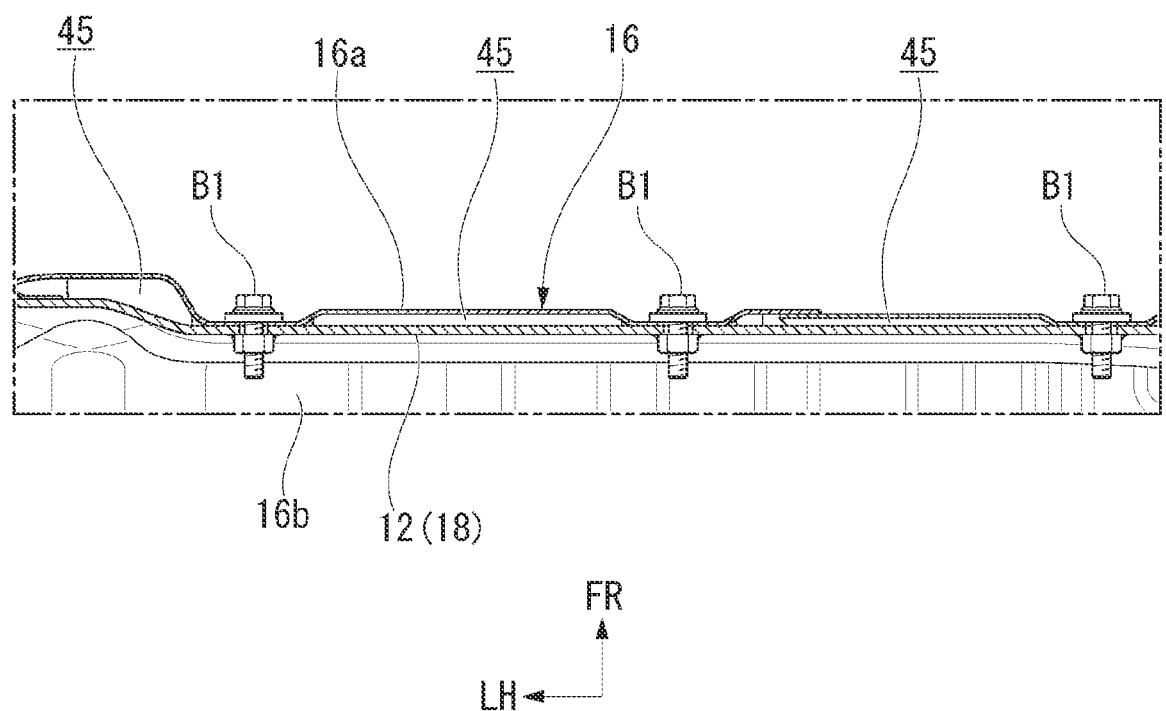
FIG. 5 is a cross-sectional view of the electric vehicle of the embodiment taken along the line V-V of FIG. 1.

FIG. 5 is a cross-sectional view taken along the line V-V of FIG. 1.

As shown in FIG. 5, a gap 45 which constitutes an exhaust port is provided between the lower edge portion of the front wall 16*a* of the cover member 16 and the front surface of the front cross member 12. The gap 45 is formed between the fastening positions of the plurality of bolts B2 in the front wall 16*a* and the front cross member 12. The gap 45 communicates with the storage space 17 inside the cover member 16 and exhausts the air that has been heat-exchanged with the power storage device 10 in the storage space 17 into the passenger compartment together with the center opening 40*c* or the side opening 40*s*.

The gap 45 formed between the front wall 16*a* of the cover member 16 and the front surface of the front cross member 12 opens downward from the storage space 17 inside the cover member 16. That is, the heat-exchanged warm air which is exhausted downward from the storage space 17 through the gap 45 flows along the front surface of the front cross member 12. Therefore, the heat-exchanged warm air does not exhaust toward the legs of the occupant seated on the seat cushion 2*s* of the rear seat 2. Here, an intake grill 30 is attached to the center region of the front wall 16*a* of the cover member 16 in the vehicle width direction to be located above the cover opening portion 21. The intake grill 30 takes in the air in the passenger compartment into the storage space 17 through the intake fan 19 to be described later. A groove cover 32 which covers a front surface side of an intake introduction groove 31 (see FIG. 6) to be described later together with the intake grill 30 is integrally formed with the side portion of the intake grill 30.

Figure 6:
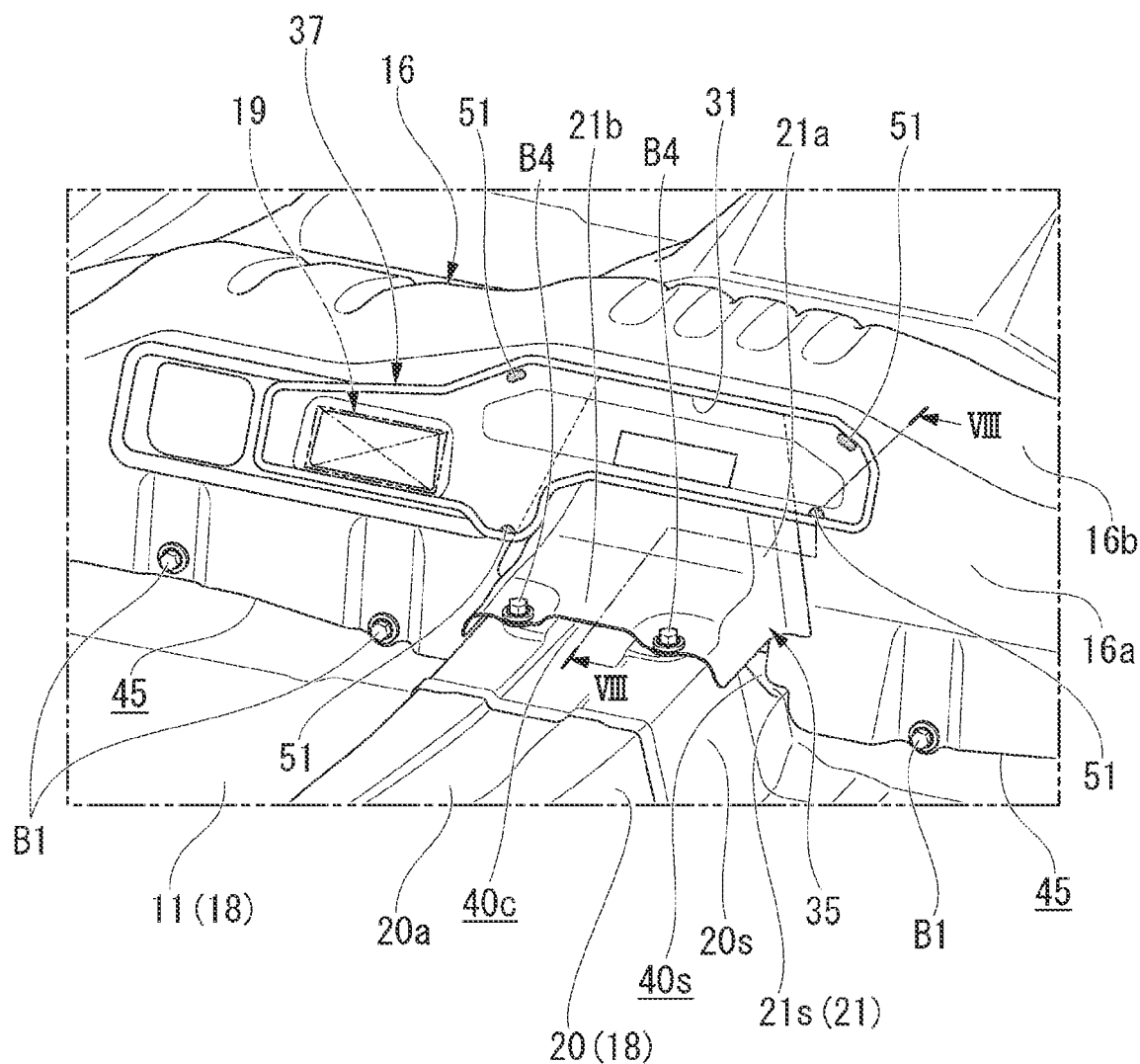
FIG. 6 is a perspective view similar to FIG. 1 in which an intake grill of the electric vehicle of the embodiment is removed.
Figure 6:
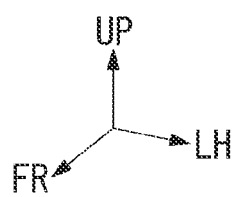

FIG. 6 is a perspective view similar to FIG. 1 in which the intake grill 30 and the groove cover 32 are removed from the cover member 16.

As shown in FIG. 6, the intake introduction groove 31 (the intake introduction portion) which is continuous to the intake portion of the intake fan 19 is formed on a front surface side of an intake guide member 37 having the intake guide member 37 attached thereto from the center region of the front surface of the front wall 16*a* of the cover member 16 in the vehicle width direction to one side portion (right side portion). The intake grill 30 and the groove cover 32 are attached to the front surface side of the intake guide member 37. The intake grill 30 and the groove cover 32 cover the front surface side of the intake introduction groove 31 and form an intake port which introduces air in the passenger compartment into the storage space 17 together with the intake guide member 37.

Figure 7:
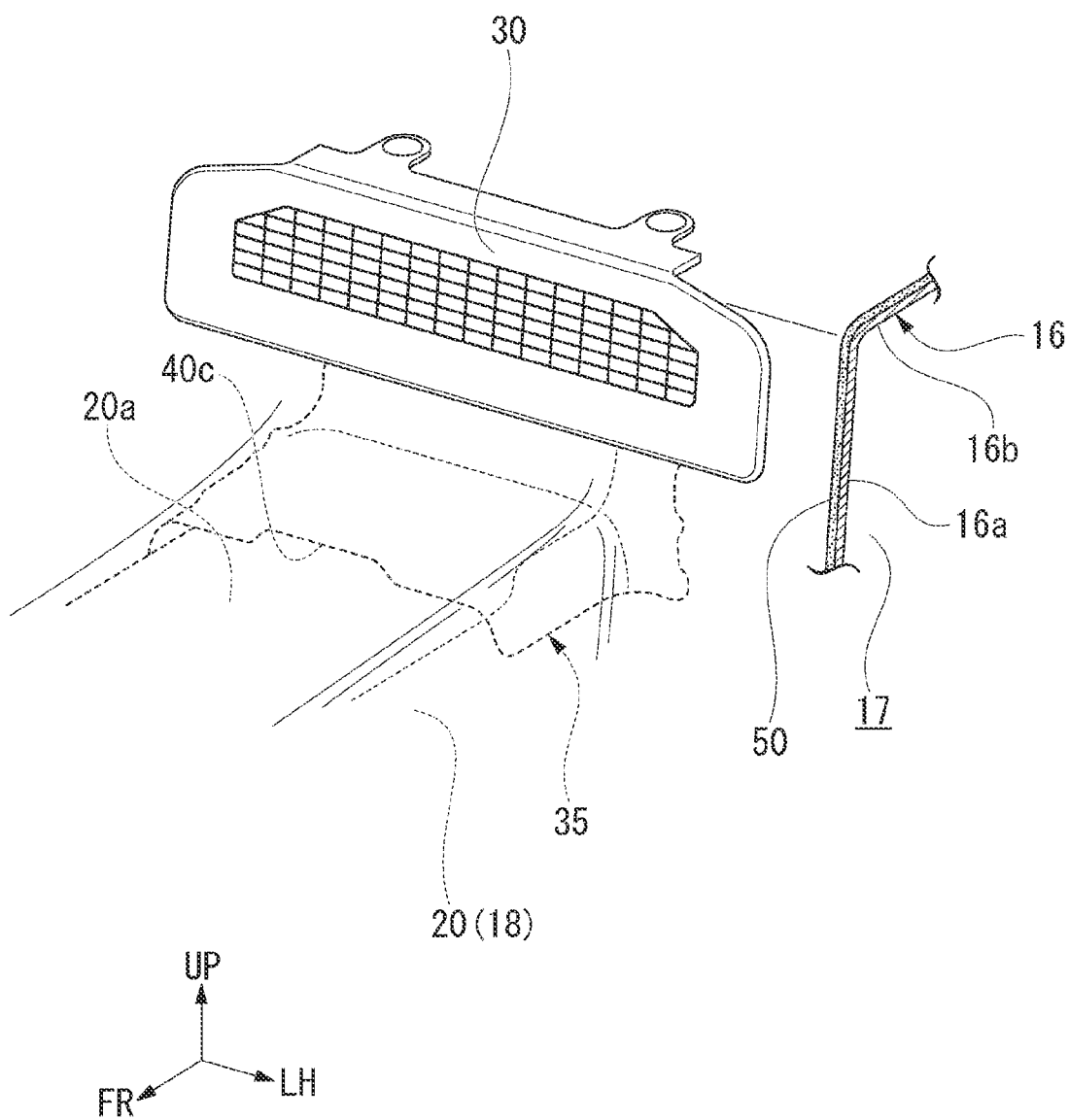
FIG. 7 is a partially cross-sectional perspective view of a rear portion of a floor having a carpet (interior trim) attached thereto in the electric vehicle of the embodiment.
Figure 8:
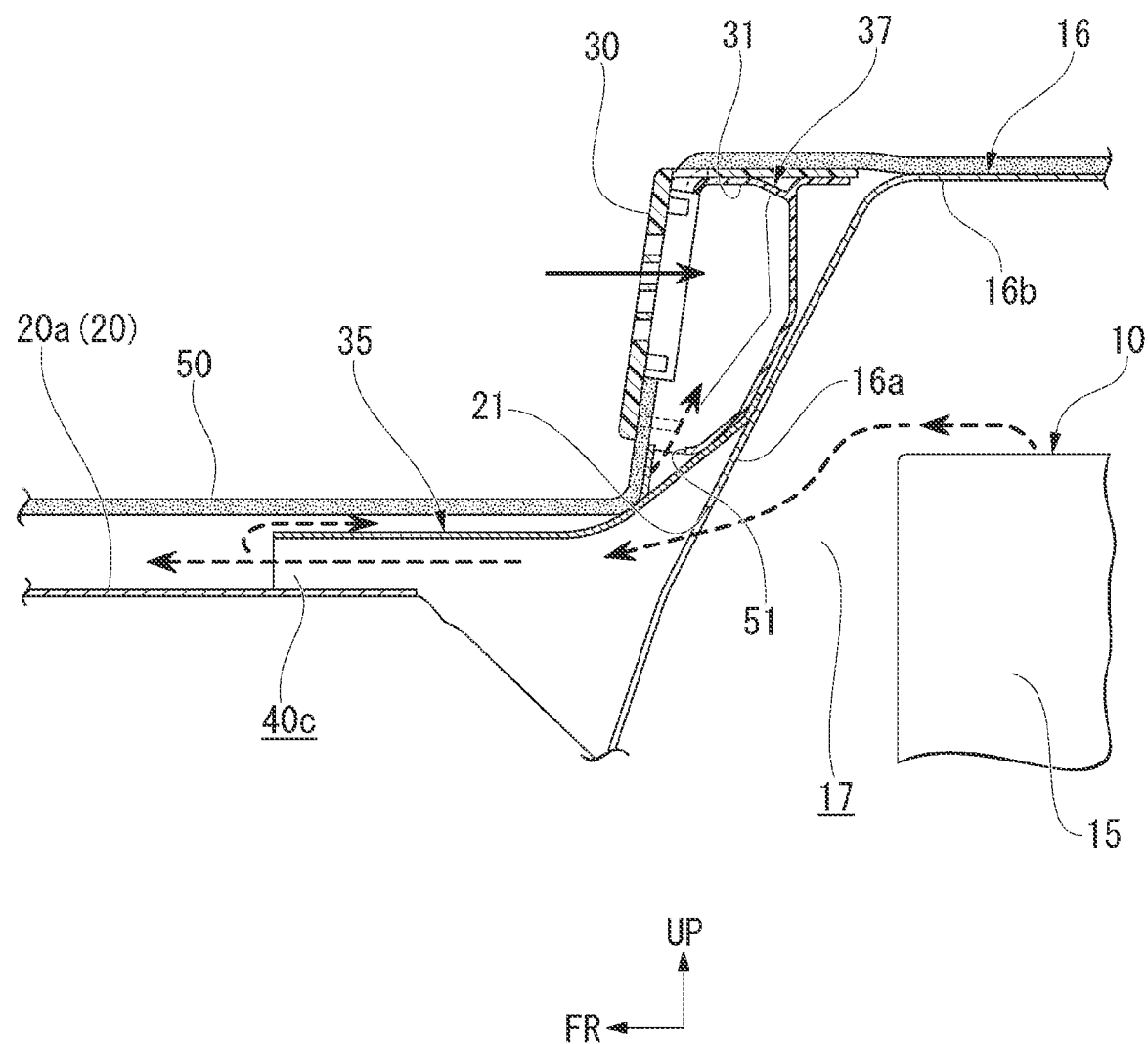
FIG. 8 is a view showing an attachment state of the carpet (interior trim) of the electric vehicle of the embodiment and is a cross-sectional view corresponding to a cross-section taken along the line VIII-VIII of FIG. 6.

FIG. 7 is a partially cross-sectional perspective view of a rear portion of a floor to which a carpet 50 corresponding to an interior trim is attached. FIG. 8 is a cross-sectional view corresponding to the cross-section taken along the line VIII-VIII of FIG. 6 showing a state in which the carpet 50 is attached to the rear portion of the floor.

The carpet 50 covers each outer region of the floor panel 11, the floor tunnel 20, and the connection plate 35 and the outer region excluding the arrangement portion of the intake grill 30 of the cover member 16. The air (heat exchanged air) exhausted from the storage space 17 to the front surface side of the front wall 16a of the cover member 16 and the lower side thereof is exhausted to the lower side of the carpet 50. The air exhausted to the lower side of the carpet 50 is exhausted into the passenger compartment from a discharge portion provided at a predetermined position of the carpet 50 (for example, the front position or the left and right side positions of the vehicle).

Further, the intake guide member 37 attached to the front wall 16a of the cover member 16 is provided with a plurality of suction holes 51 which allows the intake introduction groove 31 to communicate with a gap formed in the overlapping portion of the carpet 50 and the connection plate 35, the cover member 16, the floor tunnel 20, or the like. In other words, the intake introduction groove 31 is provided with the plurality of suction holes 51. The plurality of suction holes 51 are formed in the peripheral region of the attachment portion of the intake grill 30 in the intake guide member 37.

In the case of this embodiment, the suction hole 51 constitutes an auxiliary intake port which sucks the exhaust side air leaking from the gap of the carpet 50.

In the electric vehicle 1 with the above-described configuration, when the intake fan 19 is operated inside the cover member 16 below the rear seat 2, the air in the passenger compartment is sucked from the intake grill 30 into the storage space 17 and the air exchanges heat with the power storage device 10. Accordingly, the power storage device 10 is cooled. Then, the air that has been heat-exchanged with the power storage device 10 is discharged to the outside of the storage space 17 from the center opening 40c on the side of the front wall 16a of the cover member 16, the left and right side openings 40s, and the lower gap 45. The air discharged to the outside of the storage space 17 is exhausted into the passenger compartment while passing below the carpet 50.

Effect of Embodiment

In the electric vehicle 1 of this embodiment, since the floor member 18 and the cover member 16 constitute the exhaust port, there is no need to provide a dedicated duct to form the exhaust port. Thus, when the electric vehicle 1 of this embodiment is adopted, the air that has been heat-exchanged with the power storage device 10 can be stably exhausted into the passenger compartment without increasing the number of components in the periphery of the power storage device 10.

Further, in the electric vehicle 1 of this embodiment, the center opening 40c, the side opening 40s, the gap 45 constituting the exhaust port are provided between the front wall 16a of the cover member 16 and the floor member 18. Therefore, the air that has cooled the power storage device 10 can be efficiently exhausted forward in the passenger compartment.

Further, the front wall 16a of the cover member 16 can be widely formed along the vehicle width direction. Therefore, when this configuration is adopted, the exhaust port is provided in a wide range and the warm air that has been heat-exchanged with the power storage device 10 can be exhausted into the passenger compartment in a diffused state.

Further, in the electric vehicle 1 of this embodiment, the upper edge portion of the cover opening portion 21 of the cover member 16 and the upper surface 20u of the floor tunnel 20 are connected to each other through the connection plate 35 and the center opening 40c constituting the exhaust port is provided between the upper surface 20u of the floor tunnel 20 and the connection plate 35. Therefore, the air that has cooled the power storage device 10 in the storage space 17 can be exhausted from the center opening 40c toward the front side of the vehicle along the upper surface 20u of the floor tunnel 20.

Thus, when this configuration is adopted, the air exhausted from the center opening 40c can be smoothly sucked into the air conditioning device in front of the vehicle and impairment of the air conditioning comfort in the passenger compartment by the heat of the air discharged from the storage space 17 can be suppressed.

Further, in the electric vehicle 1 of this embodiment, the side opening 40s constituting the exhaust port is provided between the side edge 21s of the cover opening portion 21 of the cover member 16 and the side surface 20s of the floor tunnel 20. Therefore, the air that has cooled the power storage device 10 in the storage space 17 can be exhausted not only from the center opening 40c on the side of the upper surface 20u of the floor tunnel 20 but also from the side opening 40s and the exhaust blown to the passenger compartment side can be widely dispersed. Thus, when this configuration is adopted, it is possible to expand the opening area of the entire exhaust port and suppress the generation of wind noise due to an increase in the flow velocity of the blown air.

Further, in the electric vehicle 1 of this embodiment, the front wall 16a of the cover member 16 is fixed to the cross member 12 on the floor panel 11 and the gap 45 constituting the exhaust port is provided between the front cross member 12 and the front wall 16a of the cover member 16. Therefore, the exhaust port can be formed in a wide range along the front cross member 12 extending in the vehicle width direction. Thus, when this configuration is adopted, the air exhausted from the storage space 17 into the passenger compartment side can be efficiently dispersed in a wide range. As a result, it becomes possible to further suppress the generation of wind noise due to an increase in the flow velocity of the blown air. Further, in this configuration, since the front wall 16a of the cover member 16 is fixed to the front cross member 12 corresponding to a skeleton member, the rigidity of the front wall 16a of the cover member 16 can be increased.

Further, when the front wall 16a of the cover member 16 is joined to the upper surface 20u of the floor tunnel 20 through the connection plate 35 as in this embodiment, the rigidity of the floor tunnel 20 can also be increased through the connection plate 35 and the front wall 16a of the cover member 16.

Further, in the electric vehicle 1 of this embodiment, the gap 45 between the front cross member 12 and the front wall 16a of the cover member 16 opens downward from the storage space 17. Therefore, it is possible to suppress the warm air blown from the gap 45 between the front cross member 12 and the front wall 16a of the cover member 16 from directly hitting the legs of the occupant and deteriorating the air conditioning comfort provided to the occupant.

Further, in the electric vehicle 1 of this embodiment, the center opening 40c, the side opening 40s, and the gap 45 corresponding to the exhaust port are arranged in the lower portion of the carpet 50 that covers a part of the floor member 18 and the cover member 16. Therefore, the carpet 50 can block the warm air exhausted from the exhaust port from being blown directly into the occupant space. Thus, when this configuration is adopted, it is possible to suppress the warm air exhausted from the exhaust port from deteriorating the air conditioning comfort provided to the occupant.

Further, in the electric vehicle 1 of this embodiment, the intake introduction groove 31 which is continuous to the intake fan 19 is provided with the suction hole 51 (auxiliary intake port) which sucks the exhaust side air leaking from the gap between the carpet 50 and the cover member 16 or the floor member 18. Thus, when this configuration is adopted, it is possible to suppress the heat-exchanged warm air leaking from the gap of the carpet 50 from flowing into the occupant compartment side and further improve the air conditioning comfort provided to the occupant.

Additionally, the present invention is not limited to the above-described embodiment, and various design changes can be made without departing from the gist thereof.

What is claimed is:

1. An electric vehicle comprising:
   a power storage device;
   a floor member disposed on a bottom portion of a vehicle body;
   a cover member fixed to the floor member and forming a storage space for the power storage device between the floor member and the cover member;
   an intake port introducing air in a passenger compartment into the storage space; and
   an exhaust port exhausting air having been heat-exchanged with the power storage device in the storage space into the passenger compartment,
   wherein the exhaust port is an opening provided between the floor member and the cover member and is composed of the floor member and the cover member.

2. The electric vehicle according to claim 1,
   wherein the cover member includes a front wall disposed in front of the power storage device, and
   wherein the exhaust port is provided between the front wall and the floor member.

3. The electric vehicle according to claim 2,
   wherein the front wall of the cover member includes a cover opening portion opening downward in a substantially center region of a vehicle width direction,
   wherein the floor member includes
      a floor panel and
      a floor tunnel provided in a center region of the floor panel in the vehicle width direction to extend along a front and rear direction of the vehicle body such that a rear end portion is disposed in a vicinity of the front wall of the cover member,
   wherein an upper edge portion of the cover opening portion of the front wall and an upper surface of the floor tunnel are connected through a connection plate, and
   wherein a center opening constituting the exhaust port is provided between the upper surface of the floor tunnel and the connection plate.

4. The electric vehicle according to claim 3,
   wherein a side opening constituting the exhaust port is provided between a side edge of the cover opening portion and a side surface of the floor tunnel.

5. The electric vehicle according to claim 2,
   wherein the floor member includes
      a floor panel and
      a cross member disposed on an upper portion of the floor panel along the vehicle width direction, and
   wherein the front wall of the cover member is fixed to the cross member, and a gap constituting the exhaust port is provided between the cross member and the front wall of the cover member.

6. The electric vehicle according to claim 5,
   wherein a seat cushion on which an occupant sits is disposed above the cover member, and
   wherein the gap opens downward from the storage space.

7. The electric vehicle according to claim 1,
   wherein the exhaust port is disposed at a lower position of an interior trim covering a part of the cover member and the floor member.

8. The electric vehicle according to claim 7, comprising:
   an intake fan sucking air in the passenger compartment into the storage space through the intake port,
   wherein an auxiliary intake port sucking exhaust side air leaking from a gap between the cover member or the floor member and the interior trim is provided on an intake introduction portion continuous to the intake fan of the intake port.

* * * * *